Feb. 17, 1948. R. L. J. B. SANMORI 2,436,153
STEERING SYSTEM FOR VEHICLES
Filed Feb. 28, 1946 2 Sheets—Sheet 1

Inventor:
ROGER LAURENT JEAN-BAPTISTE SANMORI
BY Mock+Blum
Attorney:

Feb. 17, 1948.  R. L. J. B. SANMORI  2,436,153
STEERING SYSTEM FOR VEHICLES
Filed Feb. 28, 1946  2 Sheets-Sheet 2

Inventor:
ROGER LAURENT JEAN-BAPTISTE SANMORI
BY Mocker Blum
Attorney:

Patented Feb. 17, 1948

2,436,153

UNITED STATES PATENT OFFICE 2,436,153

STEERING SYSTEM FOR VEHICLES

Roger Laurent Jean Baptiste Sanmori, Monaco, Monaco

Application February 28, 1946, Serial No. 650,856
In France September 19, 1945

4 Claims. (Cl. 280—87)

The present invention relates to steering systems for vehicles including seating accommodations affording a plurality of seating positions for the driver, said positions being located along a line transverse, and generally substantially at right angles, to the longitudinal direction of the vehicle. The invention is more especially, although not exclusively, applicable to touring cars.

The chief object of my invention is to provide a steering system for such vehicles which is better adapted to meet the requirements of practice than those used up to the present time.

Other objects of my invention will result from the following detailed description of a specific embodiment thereof with reference to the accompanying drawings, given merely by way of example, and in which.

In the following description, it will be supposed that the invention is applied to the case of a touring car including a front seat I adapted to accommodate three persons, including the driver.

It is a well known fact that right hand drive and left hand drive both have their advantages and their drawbacks, in particular according as the car is used in town or on country roads.

Centre drive, according to which the driver occupies the middle place on the front seat, is theoretically an excellent solution, but when the front seat is occupied by only two persons, to wit, the driver and a passenger, as it is often the case, the driver has a tendency, in order to make room for the passenger, to move toward the other side so that he is no longer exactly behind the steering wheel.

In order to obviate all these drawbacks, according to the present invention, the steering system is arranged in such manner that the steering wheel 2 is transversely adjustable with respect to the vehicle and can be brought in front of any of the positions that may be occupied by the driver on the front seat.

Figure 1:
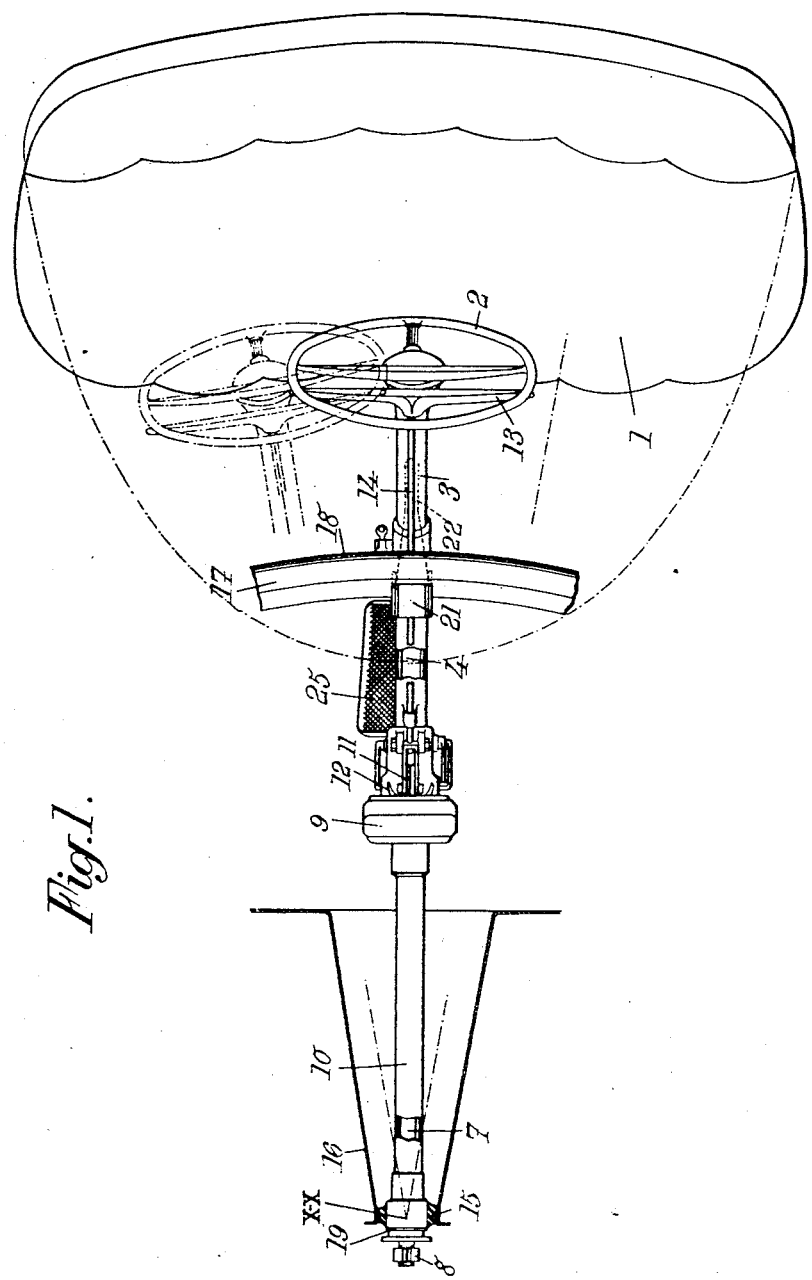
Fig. 1 is a diagrammatic plan view of a steering system for an automobile vehicle made according to the present invention.
Figure 2:
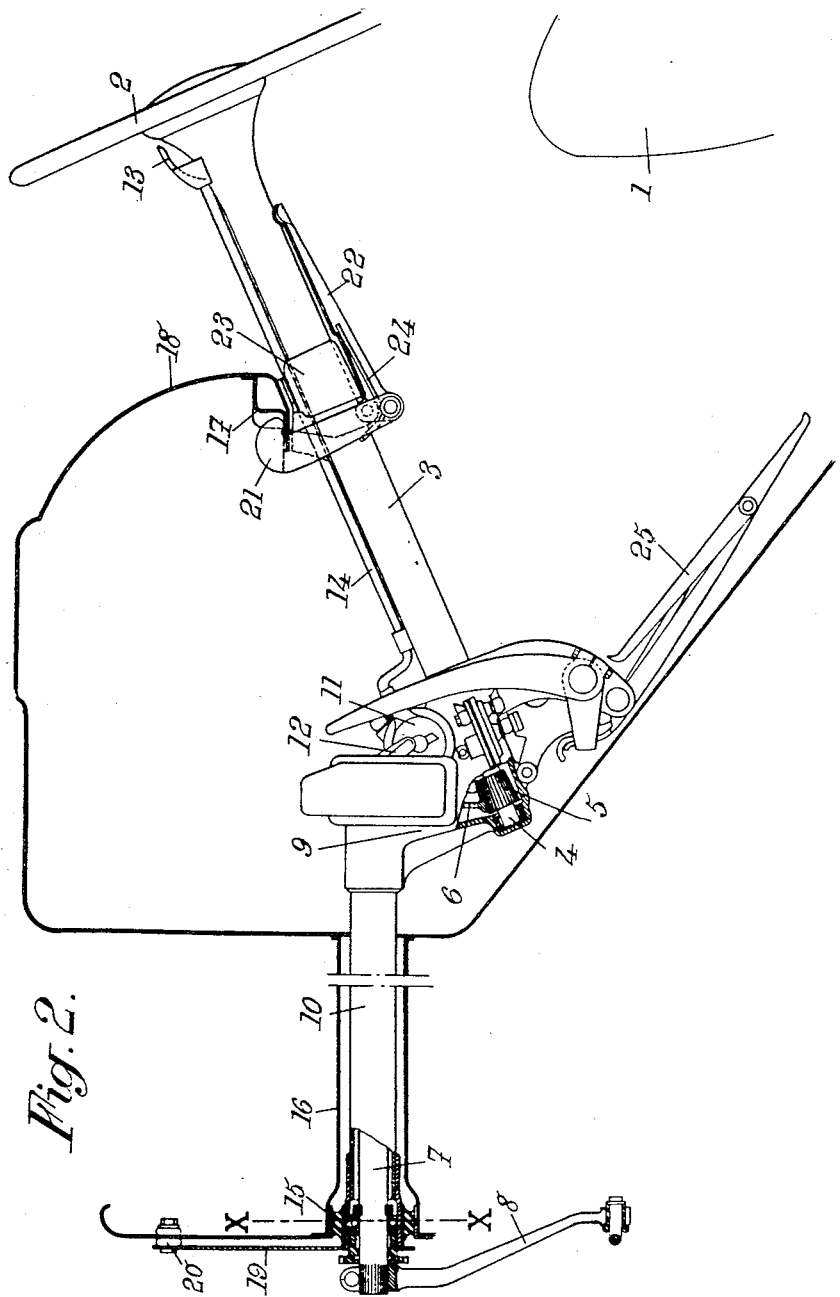
Fig. 2 is a corresponding elevational view on an enlarged scale.

Preferably, said front seat is given a slightly curved shape, as shown by Fig. 1 so that, whatever be the position occupied thereon by the driver, the latter can rest against a back part which is substantially perpendicular to the direction of the steering wheel axis.

It will be readily understood that if the range of adjustment of steering wheel 2 is chosen of sufficient amplitude, for instance 20 centimeters on either side of the middle position, a multiplicity of positions can be obtained between two extreme positions corresponding respectively to right hand drive and left hand drive.

If the normal position of the driver is to be in the central part of the front seat (a favorable position from the point of view of visibility) it suffices to provide for a relatively small amplitude of adjustment on either side of the central position.

According to a preferred embodiment of my invention, the transverse adjustment of the steering wheel is obtained by a pivoting displacement, about a substantially vertical axis, not only of the steering wheel but also of the steering column 3 by which said wheel is supported and of at least a portion of the steering gear through which the movements of the steering wheel are transmitted to the vehicle wheels.

The arrangement according to the present invention is applicable to all kinds of steering systems, but I consider that it is advantageous to combine it with the steering system described in my copending U. S. patent application Ser. No. 647,164, filed on February 12, 1946, according to which the front wheels of the vehicle are constantly used for steering purposes, while the rear wheels are only intermittently caused to participate in the steering of the vehicle. In the following description, it will be supposed that the present invention is applied to a steering system of this kind.

This steering system includes the following elements:

For the permanent steering control of the front wheels, a steering shaft 4, rigid with steering wheel 2, cooperates with a horizontal transmission shaft 7 through the intermediacy of a bevel pinion 5, keyed on shaft 4 and in mesh with a toothed sector 6 keyed on shaft 7. The front end of horizontal shaft 7 carries, fixed thereto, a vertical control arm 8 acting through suitable connecting rods (not visible on the drawing) on levers for operating the pivoting stub axles of the front wheels. The above mentioned parts of the steering gear are supported and protected by steering column 3, which contains shaft 4, a casing 9 provided at the bottom of said column, which contains gears 5, 6 and other parts, and tube 10, which surrounds shaft 7.

For temporarily imparting steering displacement to the rear wheels, the vehicle is provided with a pneumatic servo-motor (not visible on the drawing) the control element of which, constituted by a fluid distributing device 11 carried by casing 9, can be operated either automatically, when the steering angle of the front wheels exceeds a given value, by means of a crescent-shaped double lever 12 carried by shaft 7, or, manually by the driver, through an independent lever 13 carried by steering column 3 under steering wheel 2 and connected with distributing device 11 by a cranked torsion bar 14 running along said steering column 3.

The portion of the steering gear that is shown by the drawing forms a unit pivotally mounted on the vehicle so as to permit the desired adjustment of the position of steering wheel 2. In the embodiment illustrated by the drawing, this mounting is carried out as follows:

An adhesive rubber ring 15 is interposed between the front end of tube 10 and the corresponding wall of a kind of fluidtight funnel 16 surrounding said tube and the vertical side walls of which diverge toward the rear in such manner as to permit angular displacements (for instance of a maximum amplitude of 10°) of tube 10 in the horizontal direction on either side of its middle position. The portion of the steering gear that forms the unit above referred to is thus allowed to pivot about a substantially vertical axis passing through the center of rubber ring 15.

At the rear, this pivoting unit is guided with respect to the vehicle structure, for instance along a slideway 17 in the shape of a circular arc carried by said vehicle structure (in the embodiment shown by the drawing by the under wall of the instrument board 18 of the motor car). Locking means are advantageously provided, as it will be hereinafter described, for temporarily fixing said unit in any desired position along said slideway 17.

I further provide means for preventing any rotation of tube 10 about its axis with respect to the vehicle, which rotations would interfere with a good working of the steering gear. Said means are for instance constituted by a vertical rod 19 fixed at one end to the end of tube 10 and at the other end to the vehicle structure through an elastic joint 20 which permits pivoting displacements of tube 10 about the vertical axis X—X passing through joint 15 but prevents said tube 10 from rotating about its own axis.

Preferably, control arm 8, which is fixed to the end of shaft 7 is given a cranked shape so that its free end, which is connected with the front wheels, is located substantially along said vertical axis and, accordingly, its position is independent of displacements of the pivoting unit.

The means for guiding the rear or intermediate portion of the pivoting unit with respect to slideway 17 (advantageously constituted by a reinforcement of the lower portion of the instrument board 18) may be constituted, as shown by the drawings, by a kind of jaw 21 carried by steering column 3 and cooperating with said slideway. This jaw may be arranged either merely to slide thereon or preferably, as shown by way of example, to be temporarily locked thereon at any desired point thereof.

In the embodiment illustrated by the drawing, jaw 21 is pivoted to a lever 22 itself pivoted to an annular part 23 fixed to steering column 3 so as to constitute a kind of snap action mechanism. In other words, the pivot axes of jaw 21 on lever 22 and lever 22 on part 23 are parallel and their common plane passes at a short distance from the line of contact of jaw 21 with slideway 17 on the side thereof that ensures the jamming of said jaw on said slideway. When lever 22 is pivoted away from steering column 3, this plane passes on the other side of said line of contact and the jaw is released. It can then be slid along slideway 17 to any other desired position, in which it is again locked by bringing back lever 22 into contact with steering column 3. Spring 24 urges jaw 21 to turn in clock-wise direction with respect to lever 22.

Preferably, according to my invention, the pivoting unit constituted by the above described portion of the steering gear further carries the various hand or foot control members to be operated by the driver, whereby a pivoting displacement of said unit brings all these control members into proper position with respect to the desired location of the driver along the front seat of the vehicle.

For instance, the above mentioned lever 13 mounted under steering wheel 2 carries the manual means for controlling the turn signalling device, the vehicle lighting system, the sound warning device, etc., the electric contacts corresponding to said control means being mounted in a common casing carried by steering wheel 2.

Furthermore, I preferably make use of a single pedal 25, as described in my copending U. S. patent application Ser. No. 647,166, filed on February 12, 1946, for controlling both the vehicle braking system and the working of the engine, said pedal being for instance supported by casing 9.

With such a construction, the motor car can be driven with perfect ease from practically any position on the front seat thereof.

This construction has the following further advantages:

It is possible for the driver, without stopping the car, to pass over the controls to either of the passengers of the front seat.

Access to the places of said front seat can be made easier by a temporary displacement of the steering wheel.

Delicate displacements of the motor car, especially in reverse gear, are greatly facilitated by the possibility for the driver to shift the driving position from one side to the other according to the location of the obstacles to be avoided.

Aerodynamic streamlining of the front part of the vehicle is easier, in the case of a car adapted to accommodate three persons on the front seat, because there is no necessity of fixing the steering wheel on one side.

The whole can easily be removed and replaced since it forms a unit.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. In an automobile vehicle, the combination of seating accommodations affording a plurality of different seating positions for the driver located along a line transverse to the longitudinal direction of the vehicle, a steering gear for said vehicle including a horizontal longitudinal shaft, a tube coaxially surrounding said shaft, said shaft being journalled in said tube, a steering column rigid with said tube making an oblique angle therewith, a steering shaft journalled in said steering column, a steering wheel fixed to the top of said steering shaft, gear means for operatively connecting said steering shaft and said horizontal shaft, and a vertical pivoting joint between the front end of said tube and the vehicle structure, whereby the whole of said tube and said column can pivot with respect to said vehicle structure about a vertical axis passing substantially about the front end of said tube and the steering wheel can be brought in front of any of said driver seating positions.

2. In an automobile vehicle, the combination of seating accommodations affording a plurality of different seating positions for the driver located along a line transverse to the longitudinal direction of the vehicle, a steering gear for said vehicle including a horizontal longitudinal shaft, a tube coaxially surrounding said shaft, said shaft being journalled in said tube, a steering column rigid with said tube making an oblique angle therewith, a steering shaft journalled in said steering column, a steering wheel fixed to the top of said steering shaft, gear means for operatively connecting said steering shaft and said horizontal shaft, a vertical pivoting joint between the front end of said tube and the vehicle structure, whereby the whole of said tube and said column can pivot with respect to said vehicle structure about a vertical axis passing substantially about the front end of said tube and the steering wheel can be brought in front of any of said driver seating positions, circular guiding means for an intermediate part of said steering column carried by said vehicle structure, and means for locking said steering column with respect to said guiding means in any of a plurality of different relative positions.

3. In an automobile vehicle, the combination of seating accommodations affording a plurality of different seating positions for the driver located along a line transverse to the longitudinal direction of the vehicle, a steering gear for said vehicle including a horizontal longitudinal shaft, a tube coaxially surrounding said shaft, said shaft being journalled in said tube, a steering column rigid with said tube making an oblique angle therewith, a steering shaft journalled in said steering column, a steering wheel fixed to the top of said steering shaft, gear means for operatively connecting said steering shaft and said horizontal shaft, an annular elastic joint interposed between the front end of said tube and the vehicle structure, a vertical rod fixed to the front end of said tube, and an elastic joint interposed between the free end of said rod and the vehicle structure, whereby the whole of said tube and said column can pivot with respect to said vehicle structure about a vertical axis passing substantially about the front end of said tube and the steering wheel can be brought in front of any of said driver seating positions.

4. In an automobile vehicle, the combination of seating accommodations affording a plurality of different seating positions for the driver located along a line transverse to the longitudinal direction of the vehicle, a steering gear for said vehicle including a horizontal longitudinal shaft, a tube coaxially surrounding said shaft, said shaft being journalled in said tube, a steering column rigid with said tube making an oblique angle therewith, a steering shaft journalled in said steering column, a steering wheel fixed to the top of said steering shaft, gear means for operatively connecting said steering shaft and said horizontal shaft, an annular elastic joint interposed between the front end of said tube and the vehicle structure, a vertical rod fixed to the front end of said tube, an elastic joint interposed between the free end of said rod and the vehicle structure, whereby the whole of said tube and said column can pivot with respect to said vehicle structure about a vertical axis passing subsstantially about the front end of said tube and the steering wheel can be brought in front of any of said driver seating positions, circular guiding means for an intermediate part of said steering column carried by said vehicle structure, and means for locking said steering column with respect to said guiding means in any of a plurality of different relative positions.

ROGER LAURENT JEAN
BAPTISTE SANMORI.

REFERENCES CITED

The following references are of record in the file of this patent:

UNITED STATES PATENTS

| Number | Name | Date |
|---|---|---|
| 745,226 | Mott | Nov. 24, 1903 |
| 748,252 | Anderson | Dec. 29, 1903 |
| 1,230,245 | Walker | June 19, 1917 |
| 1,321,551 | Potter | Nov. 11, 1919 |

FOREIGN PATENTS

| Number | Country | Date |
|---|---|---|
| 173,213 | Great Britain | Jan. 29, 1923 |
| 411,195 | Germany | Mar. 16, 1925 |